(12) United States Patent
Li et al.

(10) Patent No.: US 6,767,663 B2
(45) Date of Patent: Jul. 27, 2004

(54) OXYGEN SEPARATION THROUGH HYDROXIDE-CONDUCTIVE MEMBRANE

(75) Inventors: Lin-Feng Li, Croton-on-Hudson, NY (US); Wenbin Yao, Fort Lee, NJ (US); Muguo Chen, Bedford Hills, NY (US)

(73) Assignee: InventQjaya Sdn. Bhd., Cyberjaya (MY)

( * ) Notice: Subject to any disclaimer, the term of this patent is extended or adjusted under 35 U.S.C. 154(b) by 302 days.

(21) Appl. No.: 09/836,119

(22) Filed: Apr. 17, 2001

(65) Prior Publication Data

US 2001/0030127 A1 Oct. 18, 2001

Related U.S. Application Data

(63) Continuation-in-part of application No. 09/373,469, filed on Aug. 12, 1999, now Pat. No. 6,541,159.

(51) Int. Cl.[7] .................... H01M 8/10; H01M 8/18; H01M 6/14; C08J 5/20
(52) U.S. Cl. ................... 429/33; 429/19; 429/303; 521/27
(58) Field of Search .................... 429/27, 30, 40, 429/33, 19, 303; 521/25, 27, 30; 205/763

(56) References Cited

U.S. PATENT DOCUMENTS

| | | | |
|---|---|---|---|
| 3,489,670 A | * | 1/1970 | Maget .................... 205/343 |
| 3,674,022 A | * | 7/1972 | Dounoucos ............... 204/522 |
| 3,923,477 A | | 12/1975 | Armond et al. |
| 4,131,514 A | | 12/1978 | Chong et al. |
| 4,216,073 A | * | 8/1980 | Goldstein ................. 204/296 |
| 4,352,864 A | * | 10/1982 | Struthers .................. 429/18 |
| 4,519,813 A | | 5/1985 | Hagiwara et al. |
| 4,617,029 A | | 10/1986 | Pez et al. |
| 4,738,760 A | | 4/1988 | Marianowski et al. |
| 4,828,941 A | * | 5/1989 | Sterzel ..................... 429/33 |
| 4,879,016 A | | 11/1989 | Joshi |
| 5,169,413 A | | 12/1992 | Leavitt |
| 5,203,887 A | | 4/1993 | Toussaint |
| 5,360,860 A | * | 11/1994 | Itoh et al. ................ 524/460 |
| 5,403,461 A | | 4/1995 | Tuller et al. |
| 5,413,625 A | | 5/1995 | Chao et al. |
| 5,500,036 A | | 3/1996 | Kalthod |
| 5,509,189 A | | 4/1996 | Tuller et al. |
| 5,534,471 A | | 7/1996 | Carolan et al. |
| 5,562,754 A | | 10/1996 | Kang et al. |
| 5,569,633 A | | 10/1996 | Carolan et al. |
| 5,572,874 A | | 11/1996 | Rathbone |
| 5,599,383 A | | 2/1997 | Dyer et al. |
| 5,616,223 A | | 4/1997 | Shen et al. |

(List continued on next page.)

FOREIGN PATENT DOCUMENTS

| | | | | |
|---|---|---|---|---|
| EP | 0771759 A1 | 5/1997 | | |
| JP | 6-267554 | * | 9/1994 | ............ H01M/8/02 |

OTHER PUBLICATIONS

Bouwmeester et al., "Dense Ceramic Membranes for Oxygen Separation", *The CRC Handbook of Solid State Electrochemistry*, pp. 481–553 (1997).

Buehler et al., "The Production of High Purity Oxygen", *Journal of the Electrochemical Society*, vol. 132, pp. 2970–2972, (1985).

Dyer et al., "Ion Transport Membrane Technology for Oxygen Separation and Syngas Production", *Solid States Ionics 134*, pp. 21–33 (2000).

(List continued on next page.)

*Primary Examiner*—Patrick Ryan
*Assistant Examiner*—Julian Mercado
(74) *Attorney, Agent, or Firm*—Ralph J. Crispino

(57) ABSTRACT

An electrochemical cell for separating a first gas from a mixture of gas is provided, particularly for separating oxygen from air. The cell includes a first electrode, a second electrode and a hydroxide-conducting membrane between the first electrode and the second electrode.

32 Claims, 3 Drawing Sheets

U.S. PATENT DOCUMENTS

| | | | |
|---|---|---|---|
| 5,639,437 A | | 6/1997 | Balachandran et al. |
| 5,643,355 A | | 7/1997 | Phillips et al. |
| 5,643,968 A | * | 7/1997 | Andreola et al. ............ 521/27 |
| 5,656,388 A | | 8/1997 | Bugga et al. |
| 5,677,074 A | | 10/1997 | Serpico et al. |
| 5,681,373 A | | 10/1997 | Taylor et al. |
| 5,683,797 A | | 11/1997 | Carolan et al. |
| 5,706,675 A | | 1/1998 | Manikowski, Jr. |
| 5,711,787 A | | 1/1998 | Neill et al. |
| 5,733,435 A | | 3/1998 | Prasad et al. |
| 5,750,279 A | | 5/1998 | Carolan et al. |
| 5,788,826 A | | 8/1998 | Nyberg |
| 5,898,918 A | | 4/1999 | Leppanen |
| 6,087,412 A | * | 7/2000 | Chabrecek et al. ........... 522/35 |
| 6,171,368 B1 | | 1/2001 | Maget et al. |
| 6,183,914 B1 | * | 2/2001 | Yao et al. .................. 429/309 |
| 6,358,651 B1 | * | 3/2002 | Chen et al. ................ 429/303 |

OTHER PUBLICATIONS

Fujita et al., "An Electrochemical Oxygen Separator Using an Ion–Exchange Membrane as the Electrolyte", *Journal of Applied Electrochemistry*, vol. 16 pp. 935–940, (1986).

Fujita et al., "Oxygen Remover Using Gas Diffusing Electrodes", 51 *Denki Kagaku* 272, (*English Translation Provided*).

Langer et al., "Electrolytic Separation and Purification of Oxygen from a Gas Mixture", *Journal of Physical Chemistry*, vol. 68, pp. 962–963, (1964).

S. Tomter, "Extracting Oxygen for Fuel", *Chemical Engineering Progress*, vol. 62, pp. 66–67, (1966).

Tseung et al., "An Integrated Electrochemical–Chemical Method for the Extraction of $O_2$ from Air", *Journal of Applied Electrochemistry*, vol. 11, pp. 209–215, (1981).

Wright et al., "Advanced Oxygen Separation Membranes", *Tropical Report* (Apr. 1989–Sep. 1990), Gas Research Institute, Doc. No. GRI–90/0303.

Wynveen et al., "An Experimental Oxygen Concentrating System", *Aerospace Medicine*, pp. 712–718, (1967).

* cited by examiner

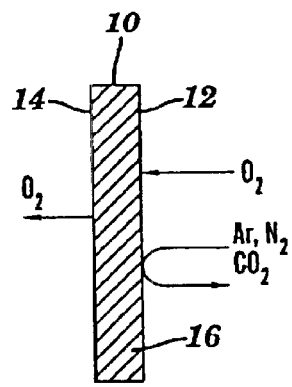
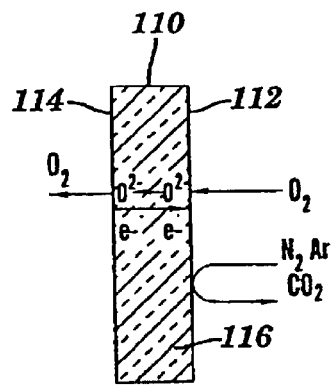
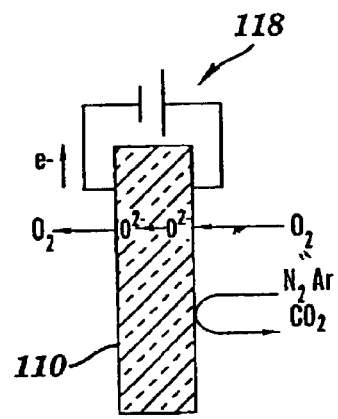
FIG. 1a
PRIOR ART
FIG. 1b
PRIOR ART
FIG. 1c
PRIOR ART
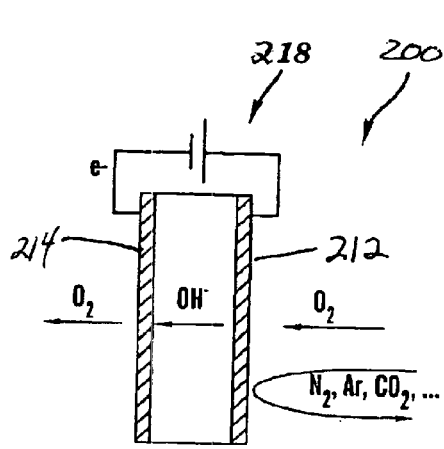
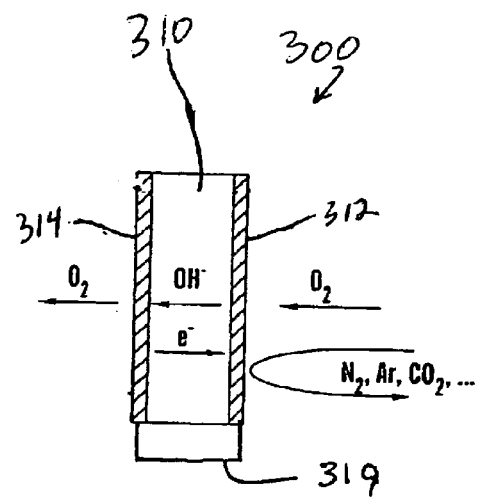
FIG. 2
FIG. 3

Sampling of sweep in $O_2$ generation run: $O_2$ peak only

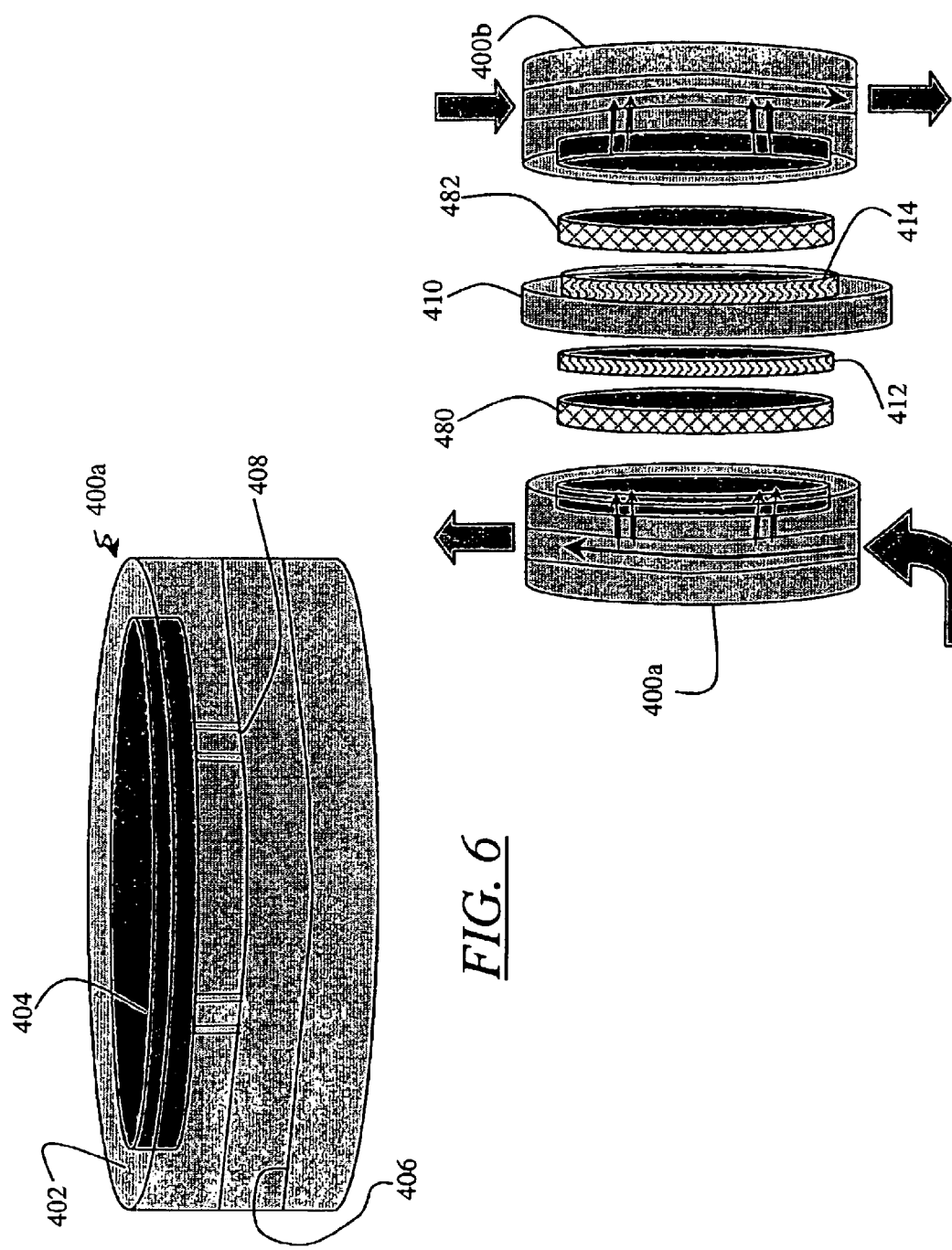

OXYGEN SEPARATION THROUGH HYDROXIDE-CONDUCTIVE MEMBRANE

RELATED CASES

This is a Continuation-in-Part of application Ser. No. 09/373,469 filed Aug. 12, 1999 entitled "Oxygen Separation Through Hydroxide Conductive Membrane" by Lin-Feng Li, Wayne Yao and Muguo Chen, now U.S. Pat. No. 6,541,159 B1, which is incorporated by reference herein.

BACKGROUND OF THE INVENTION

1. Field of the Invention

This invention relates to the field of gas separation, and more particularly to gas separation using a hydroxide ion conductive membrane.

2. Description of the Prior Art

There is an ever-increasing need for improved systems and methods for efficient and rapid separation of selective components from mixtures. In particular, techniques for the separation of selective components from gaseous mixtures have many significant technical applications. Many important chemical, environmental, medical and electronics processing technologies require pure gas, particularly pure oxygen gas. For example, oxygen is used in semiconductor fabrication for chemical vapor deposition, reactive sputtering and reactive ion etching. It finds wide application in health services, for resuscitation, or, in combination with other chemicals, for anesthesia. Oxygen can also be used to achieve environmental benefits by reducing the sulfur emissions of oil refineries and helping pulp and paper manufacturers meet regulations relating to bleaching, delignification and lime kiln enrichment. However, the high cost of pure oxygen typically limits the wide adoption of such beneficial processes in the chemical, electronics and medical industries. Further, nitrogen is used, for example, to protect perishable goods, to protect oxygen-sensitive materials and to facilitate oxygen sensitive processes.

High-purity oxygen (e.g., 99.5%+) is largely produced in cryogenic air separation plants, where the air is cooled down to the melting point of nitrogen (−210° C.) and its components separated in large condensation columns. This process requires expensive, bulky equipment and high-energy consumption, which tends to militate against the use of oxygen to generate energy. Cryogenic air separation is typically commercially feasible only on large scale generation systems.

Adsorption, both pressure-swing absorption (PSA) and vacuum-swing absorption (VSA), is widely used for producing moderate purity oxygen (e.g., 85–90%). The gas separation is generally based on selective adsorption of nitrogen by synthetic zeolites. Nitrogen, which is more readily polarizable than oxygen, interacts more strongly with the electrostatic fields in the zeolites structure. Nitrogen is thus retained by the zeolites, while oxygen passes through. When the zeolite is saturated with nitrogen, it must be stripped, generally by reducing the pressure.

Polymer membrane air separation has also been used to produce air slightly enriched in oxygen (e.g., 28–35%) or for nitrogen enriched blanketing (e.g., 95–99%). Polymeric air separation membranes are typically selectively permeable, whereby the polymeric materials are more permeable to oxygen than nitrogen. Transport through the membrane is induced by maintaining the vapor pressure on the permeate side of the membrane lower than the vapor pressure of the feed mixture. The driving force is typically the difference in partial vapor pressure of each species across the membrane.

One typical configuration includes a system of hollow fibers, wherein air is passed over the exterior of the fibers, and enriched oxygen permeates to the interior of the fibers. Another typical configuration used a spiral wound system, wherein air is passed through an edge of a configuration of feed channels, membranes and a permeate channel wound about a porous tube. The permeate exits the system from the porous tube. Production of relatively high purity oxygen with air separation based on selective permeability is not commercially feasible, and is only suitable for applications where only oxygen-enriched air is required.

The permeability of a membrane for a particular gas species is related to the volumetric flow (cubic centimeters (at standard pressure and temperature) per second (cc(STP)/s)) of the desired species through a unit length of membrane thickness (in centimeters) per area of membrane (in centimeters squared) per pressure differential (expressed in centimeters of mercury). The permeability is generally expressed in Barrer units, where:

$$1 \text{ Barrer} = 1 \times 10^{-10} \left[ \frac{\text{cc(STP)} \cdot \text{cm}}{\text{cm}^2 \cdot \text{s} \cdot \text{cm Hg}} \right]. \quad (1)$$

Additionally, selectivity is critical to effective permeability based gas separation, such that a desired species permeates at a greater rate than another species. Selectivity (alpha) is generally expressed as:

$$\alpha_{A,B} = \frac{\text{Permeability}_A}{\text{Permeability}_B}. \quad (2)$$

A relatively new technology that has emerged for relatively high purity gas separation involves selective membranes which pass only the desired components, such as described by H. J. M. Bouwmeester, A. J. Burggraaf, in "The CRC Handbook of Solid State Electrochemistry," Ed. P. J. Gellings, H. J. M. Bouwmeester, chapter 11, CRC Press, Boca Raton, 1997, which is incorporated by reference herein. Various known membranes include ionic conducting membranes and mixed ionic-electronic conducting membranes, which rely on the transportation of oxide ($O^{2-}$) ions to separate the oxygen from air. Although these approaches may offer some advantages relative to cryogenic oxygen separation, practical application of the MIEC membrane is hindered by a number of drawbacks intrinsic to oxide ($O^{2-}$) conductive membranes. These problems include: low oxygen throughput (typically caused by both low ionic conductivity and low surface oxygen exchange rate); relatively high operating temperature (>800° C.); costly materials and costly fabrication; tendency to degrade over time; and system equipment that is relatively complex and expensive to build and maintain.

Turning now to FIG. 1a, a general process that occurs in a conventional ionic-electronic membrane 10 is shown. Air arrives at a cathode 12, where oxygen is reduced, but other species do not react. The oxygen is shuttled across a membrane 10 in the form of an ion such as $O^{2-}$ (the process of ionic conduction). At an anode 14, a complementary chemical reaction evolves pure oxygen, which is released. Functionally, this type of membrane 10 has three primary components: a backbone 16, which provides the membrane's structure; an ionic conductor (not shown), which conducts the ions across the membrane; and a catalyst (not shown), which aids the reduction of oxygen at the cathode 12 and the evolution of oxygen at the anode 14.

The overall oxygen throughput is determined primarily by two parameters (the conductivity of the electrons is generally too fast to be a limiting factor). The first is the ionic conductivity (how fast the ions can travel across the membrane), which is dependent on the electrolyte properties. The second is the surface oxygen exchange rate (how quickly the oxygen is reduced and evolved on each side), which is dependent on both the ionic conductor and the catalyst properties of the electrodes.

Referring now to FIG. 1b, prior art mixed ionic-electronic conducting membranes 110 typically utilize only a single component, i.e., a ceramic-noble metal composite, to play all three functional roles, namely, backbone, ion conduction and catalyst. This material provides the physical membrane structure 116, reduces and evolves the oxygen, and relays the $O^{2-}$ ions and charge-compensating electrons in opposite directions as shown. To drive the reaction, a pressure differential is required, with the air pressure at the cathode 112 exceeding the oxygen pressure at the anode 114, i.e., by a factor of about 2 to 10.

As shown in FIG. 1c, a similar approach known as "active oxygen pumping" utilizes a membrane 110 in combination with an external circuit 118, instead of a pressure differential, to drive the reaction.

As mentioned hereinabove, there are several disadvantages associated with the current ceramic-based membranes (ionic conducting and mixed ionic-electronic conducting) approach, which are intrinsic to oxide-conducting membranes.

One such disadvantage is their relatively high operating temperatures. The chemistry of the ceramic-noble metal membrane material requires temperatures near 800° C. for the anode and cathode reactions, as well as the ionic conduction, to proceed.

A further disadvantage of ceramic membranes is their relatively high material and production cost. Since ceramic membranes generally use the same material to conduct the oxide ions and as the backbone material, restrictions are placed on the possible materials that may be used. In particular, noble metals such as platinum and palladium are generally required to obtain desirable stability at required operating temperatures and to promote the oxygen surface reaction, and these metals are relatively expensive. Also, fabrication of the backbone structure requires relatively strict and careful control to produce the correct density and degree of mixing between the ceramic and the metal. This tends to increase the expense of the process and lower overall yield.

Another disadvantage of ceramic based membranes is relatively low long-term stability under their operating conditions. At the 800° C. operating temperature of these membranes, the ceramic and the noble metal tend to react with one another, generating oxidization of the metal and a concomitant degradation in performance through lower conductivity. This instability generally renders such a system impractical for large-scale applications.

An engineering problem associated with systems that incorporate these high-temperature, high-pressure oxide-conducting membranes involves sealing the membrane so that air cannot leak past it. Any such leakage tends to disadvantageously lower the purity of oxygen on the downstream side. This problem has been addressed by welding the sides of the membrane to input and output gas lines, but it is a relatively costly and troublesome solution.

All of the above problems, which are intrinsic to the ceramic-noble metal system, illustrate the undesirability of current oxide-conducting membrane technology.

Additional ionic conducting membranes have been proposed based on cation (i.e., proton) exchange membranes, which typically utilize fluorocarbon-type resins (e.g., the Nafion® family of resins which have sulfonic acid group functionality, commercially available from DuPont Chemicals, Wilmington, Del.), precious metal (e.g., Pt) anodes and air cathodes. In such systems, separation is based on proton (i.e., hydrogen cation) conduction through the membrane. Oxygen reduces at the cathode and forms water with a provided electrical voltage and hydrogen cations in the membrane, and evolves at the anode from water. Commercial realization of cation exchange membrane based air separation systems is limited by the costs of both the membrane and the catalysts materials.

Thus, a need exists for an oxygen separation method and apparatus that addresses the problems associated with conventional air separation techniques and systems.

SUMMARY OF THE INVENTION

The above-discussed and other problems and deficiencies of the prior art are overcome or alleviated by the several methods and apparatus of the present invention, wherein a hydroxide-conducting material is utilized to separate gases. An important aspect is that hydroxide ions ($OH^-$), rather than oxide ions ($O^{2-}$) or protons, may be utilized to shuttle oxygen molecules through a membrane at relatively high oxygen throughput. The hydroxide ion generally has higher conductivity than the oxide ion at any given temperature. Also, the surface oxygen exchange rate is higher in an alkaline electrolyte than in oxide electrolytes and acidic electrolytes (such as in the proton exchange membrane), especially at low temperature.

The present invention provides, an electrochemical cell for separating a first gas from a mixture of gas is provided, particularly for separating oxygen from air. The cell includes a first electrode, a second electrode and a hydroxide-conducting membrane between the first electrode and the second electrode.

The above-discussed and other features and advantages of the present invention will be appreciated and understood by those skilled in the art from the following detailed description and drawings.

BRIEF DESCRIPTION OF THE DRAWINGS

FIG. 1a is a schematic representation of the principle of oxygen separation from air through an inorganic, dense, ion-conductive membrane of the prior art;

FIG. 1b is a schematic representation of the principle of oxygen separation from air through an inorganic, dense, mixed ionic-electronic conductive membrane of the prior art;

FIG. 1c is a schematic representation of the principle of oxygen separation from air through an inorganic, dense, ionic conductive membrane of the prior art, utilizing active oxygen pumping;

FIG. 2 is a schematic diagram of an oxygen separation system using a hydroxide-conductive membrane embodied herein;

FIG. 3 is a schematic diagram of another oxygen separation system using a hydroxide-conductive membrane embodied herein;

FIG. 6 is an example of a supporting and conducting structure for a tested system using a hydroxide-conductive membrane embodied herein;

FIG. 7 is a schematic of a system for separating oxygen from air used in an exemplary embodiment.

DETAILED DESCRIPTION OF THE ILLUSTRATIVE EMBODIMENTS

Figure 4:
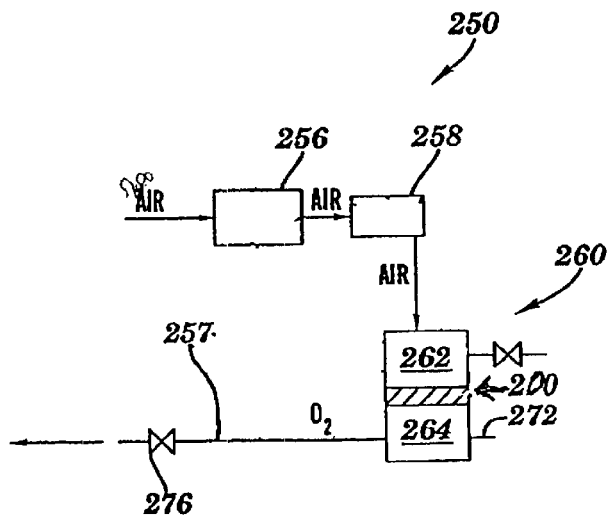
FIG. 4 is a schematic diagram of an oxygen separation system using the hydroxide-conducting membrane system of FIG. 2.

An electrochemical cell for separating a first gas from a mixture of gases is provided, particularly for separating oxygen from air. The cell includes a first electrode, a second electrode and a hydroxide-conducting electrolyte between the first electrode and the second electrode. In preferred embodiments, the electrolyte includes a supportive polymeric molecular structure and a hydroxide-conducting medium.

Referring to the figures set forth in the accompanying drawings, illustrative embodiments of the present invention will be described in detail hereinbelow. For clarity of exposition, like features shown in the accompanying drawings shall be indicated with like reference numerals and similar features as shown in alternate embodiments in the Drawings shall be indicated with similar reference numerals.

Briefly described, the present invention includes a hydroxide (OH⁻) conductive membrane that overcomes drawbacks associated with oxide conductive membranes. The invention is based in part upon our commonly assigned U.S. patent application Ser. No. 09/259,068, entitled "Solid Gel Membranes", filed on Feb. 26, 1999; and U.S. Pat. No. 6,183,914, entitled "Polymer-Based Hydroxide Conducting Membrane," filed on Sep. 17, 1998, both of which are incorporated by reference herein. Compared to conventional mixed ionic-electrical conductive membrane technology that operates at high temperatures (>800° C.), the membrane herein provides sufficient ionic conductivity and surface oxygen exchange rate at room temperature. Further, use of room temperature systems allows for greater flexibility in selecting materials, has robust construction, and provides reduced overall system cost due to relatively low material cost and lower temperature operation.

The membrane used in systems described herein is a hydroxide-conducting membrane. In general, the membrane is macroscopically non-aqueous. In certain embodiments, systems described herein employ membranes having physical characteristics (e.g., porosity) capable of supporting a hydroxide source, such as a gelatinous alkaline material. In other embodiments, systems described herein employ polymer membranes having a composite of a molecular structure and a hydroxide source, such as an aqueous electrolyte. In further embodiments, systems described herein employ anion exchange membranes.

An electrochemical cell is detailed, having a first electrode (e.g., oxygen reducing electrode) and a second electrode (e.g., oxygen evolving electrode) separated by a hydroxide-conducting membrane. Upon application of a driving force across the respective sides of the cell (e.g., an electrical potential across the electrodes or a pressure differential between the gas reducing side and the gas evolution side), hydroxide ions are relayed from the oxygen reducing electrode to the oxygen evolving electrode.

Turning now to FIG. 2, one embodiment of an electrochemical cell 200 for gas separation is depicted. The cell 200 includes a hydroxide-conducting membrane electrolyte 210, and a cathode 212 and an anode 214 disposed on opposite sides of the membrane 210. The materials utilized for the cathode 212 and the anode 214 may include oxygen reducing and evolving catalysts, respectively, as will be discussed in greater detail hereinbelow. The membrane comprises a hydroxide-conducting membrane such as a physically supported hydroxide source, a molecularly supported hydroxide source, or an anion exchange membrane, as will be discussed in greater detail hereinbelow.

The cell 200 operates with an external current pumping mechanism (i.e., circuit 218) such as shown and described hereinabove with respect to FIG. 1c. In this manner, membrane 210 provides hydroxide conduction. At the cathode 212, $O_2$ molecules are reduced into hydroxide ions (OH⁻) by electrons transported from the anode 214 through the outside circuit. Balancing the reaction, OH⁻ is relayed through the electrolyte to the anode 214 side, where it is reoxidized into $O_2$ and released, so the electrons can return to the cathode side. Application of DC voltage of a required magnitude causes the following reactions to occur at the electrodes:

At the cathode:

$$\tfrac{1}{2}O_2 + H_2O + 2e^- \rightarrow 2OH^- \qquad (1)$$

At the anode:

$$2OH^- \rightarrow \tfrac{1}{2}O_2 + H_2O + 2e^- \qquad (2)$$

In an alternative embodiment, the driving force is a thermodynamic driving force, wherein the pressure of the oxygen on the inlet side is greater than the pressure on the outlet side. Electron transfer is accomplished by electrically connecting the electrodes. Such a configuration is depicted in FIG. 3, wherein a cell 300 is provided having a cathode 312 and an anode 314 in ionic communication through a hydroxide-conducting membrane 310. The anode 314 and the cathode 312 are electrically connected to one another via a conductor 319. Alternatively, the electrical connection between the anode 314 and the cathode 312 may be facilitated by electrically conductive properties within or through the membrane 310, such as a current collector or dispersion of electrically conducting material in the case of a physically supported hydroxide source, or an electrically conducting polymeric structure or functionality in the case of a molecularly supported hydroxide source or an anion exchange membrane. Advantageously, unlike in conventional MIEC membranes, the ionic and electronic conduction in the present invention are mediated by chemically separate materials (the electrolyte and the conductor 319, respectively).

In various alternatives of providing the electrical conductive path, a conductor may be in the form of a mesh, porous plate, metal foam, strip, wire, plate, or other suitable structure embedded within the membrane between the electrodes. The current collector is preferably porous to minimize electrolyte obstruction. The conductor may be formed of various electrically conductive materials including, but not limited to, copper, ferrous metals such as stainless steel, nickel, chromium, titanium, and the like and combinations and alloys comprising at least one of the foregoing materials.

At the cathode 312, $O_2$ molecules are reduced into hydroxide ions (OH⁻) by electrons transported from the anode 314 through the conductor 319. Balancing the reaction, OH⁻ is relayed through the electrolyte to the anode 214 side, where it is reoxidized into $O_2$ and released, so the electrons can return to the cathode side.

Figure 5:
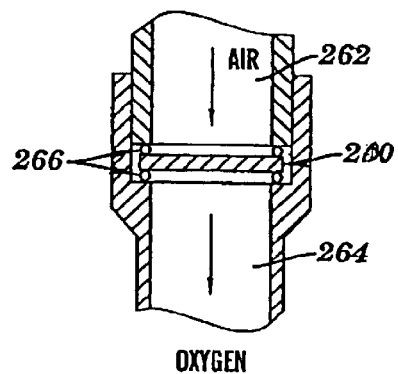
FIG. 5 is schematic representation, on an enlarged scale, of a membrane assembly usable in the oxygen separation system of FIG. 4.

The completed cell 200 may be integrated into a system 250 such as shown schematically in FIGS. 4 and 5. A power source is utilized to drive the oxygen generation process by passing an electrical current across the electrodes 212, 214. Optionally, the carbon dioxide content of the air provided to the cell 200 is minimized. As $CO_2$ may react with the base, reduced $CO_2$ content is preferred so as to not adversely affect operation of the membrane. For example, ambient air may optionally be fed through a $CO_2$-scrubber 256. The scrubber 254 is a conventional device, such as one which utilizes limestone and which may be easily regenerated as required by heating it off-line. Alternatively, an air source may be provided having minimal $CO_2$ content.

The air is then optionally fed to a water source 258, generally to humidify the air to facilitate electrochemical reaction in the system 200. The air is then fed into an oxygen separation chamber 260.

As best shown in FIG. 5b, chamber 260 includes an air chamber 262 and an oxygen chamber 264, with the cell 200 mounted therebetween in a substantially air-tight (i.e., gas-tight) manner. As shown, two O-ring-type gaskets 266 made of a sealing material such as PTFE or natural or synthetic rubber, may be utilized to provide such gas-tight mounting. Advantageously, the low temperature operation of the cell 200 obviates the need for relatively complicated and/or expensive welding or other sealing techniques generally utilized to seal typical high-operating-temperature ceramic membranes.

Oxygen emerging from chamber 264 is coupled to an oxygen collection device (not shown). A vacuum pump (not shown) also may optionally be coupled to flow path 257 through a valve 276 to evacuate the oxygen chamber at the beginning of the operation. An oxygen gas sensor 272 may be used to monitor the level of oxygen within the oxygen chamber 264. The system 250 thus provides for relatively simple and inexpensive oxygen production, which may occur at ambient temperature and pressure conditions. Various systems, however, may benefit from the addition of a pressure differential across the cell system, e.g., by feeding air at elevated pressures, as described below.

In an alternative configuration (not shown), the cell 300 may be used in a system similar to system 250, wherein instead of a voltage applied across the electrodes, a thermodynamic driving force is used. In such a system, the feed air may be compressed or otherwise fed at elevated pressures.

As previously mentioned, the membrane employed in the gas separation cells described herein are hydroxide conducting membranes. The membrane may have hydroxide conducting properties by virtue of physical characteristics (e.g., porosity) capable of supporting a hydroxide source, such as a gelatinous alkaline material; molecular structure that supports a hydroxide source, such as an aqueous electrolyte; anion exchange properties, such as anion exchange membranes; or a combination of one or more of these characteristics capable of providing the hydroxide source.

In certain embodiments, the membrane comprises a material having physical characteristics (e.g., porosity) capable of supporting a hydroxide source, such as a gelatinous alkaline solution. For example, various separators capable of providing ionically conducting media are described in: U.S. Pat. No. 5,250,370 entitled "Variable Area Dynamic Battery," Sadeg M. Faris, Issued Oct. 5, 1993; U.S. application Ser. No. 08/944,507 filed Oct. 6, 1997 entitled "System and Method for Producing Electrical Power Using Metal Air Fuel Cell Battery Technology," Sadeg M. Faris, Yuen-Ming Chang, Tsepin Tsai and Wayne Yao; U.S. application Ser. No. 09/074,337 filed May 7, 1998 entitled "Metal-Air Fuel Cell Battery Systems," Sadeg M. Faris and Tsepin Tsai; U.S. application Ser. No. 09/110,762 filed Jul. 3, 1998 entitled "Metal-Air Fuel Cell Battery System Employing Metal Fuel Tape and Low-Friction Cathode Structures," Sadeg M. Faris, Tsepin Tsai, Thomas J. Legbandt, Muguo Chen and Wayne Yao; U.S. Pat. No. 6,190,792 issued Feb. 20, 2001 entitled "Ionically-Conductive Belt Structure for Use in a Metal-Air Fuel Cell Battery System and Method of Fabricating the Same," Sadeg M. Faris, Tsepin Tsai, Thomas Legbandt, Wenbin Yao and Muguo Chen; U.S. application Ser. No. 09/116,643 filed Jul. 16, 1998 entitled "Metal-Air Fuel Cell Battery System Employing Means for Discharging and Recharging Metal-Fuel Cards," Sadeg M. Faris, Tsepin Tsai, Wenbin Yao and Muguo Chen; U.S. application Ser. No. 09/268,150 filed Mar. 15, 1999 entitled "Movable Anode Fuel Cell Battery," by Tsepin Tsai and William Morris; U.S. application Ser. No. 09/526,669 filed Mar. 15, 2000 "Movable Anode Fuel Cell Battery," Tsepin Tsai, William F. Morris, all of which are herein incorporated by reference.

In general, the type of material having physical characteristics capable of supporting a hydroxide source may comprise an electrolyte gel. The electrolyte gel may be either applied directly on the surface of the evolution and/or reduction electrodes, or applied as a self supported membrane between the evolution and reduction electrodes. Alternatively, the gel may be supported by a substrate and incorporated between the evolution and reduction electrodes.

The electrolyte (in all variations of the membrane herein) generally comprises ion conducting material to allow ionic conduction between the metal anode and the cathode. The electrolyte generally comprises hydroxide-conducting materials such as KOH, NaOH, LiOH, RbOH, CsOH or a combination comprising at least one of the foregoing electrolyte media. In preferred embodiments, the hydroxide-conducting material comprises KOH. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 40% ionic conducting materials.

The gelling agent for the membrane may be any suitable gelling agent in sufficient quantity to provide the desired consistency of the material. The gelling agent may be a crosslinked polyacrylic acid (PAA), such as the Carbopol® family of crosslinked polyacrylic acids (e.g., Carbopol® 675) available from B F Goodrich Company, Charlotte, N.C., Alcosorb® G1 commercially available from Allied Colloids Limited (West Yorkshire, GB) and potassium and sodium salts of polyacrylic acid; carboxymethyl cellulose (CMC), such as those available from Aldrich Chemical Co., Inc., Milwaukee, Wis.; hydroxypropylmethyl cellulose; gelatine; polyvinyl alcohol (PVA); poly(ethylene oxide) (PEO); polybutylvinyl alcohol (PBVA); combinations comprising at least one of the foregoing gelling agents; and the like. Generally, the gelling agent concentration is from about 0.1% to about 50% preferably about 2% to about 10%.

The optional substrate may be provided in forms including, but not limited to, woven, non-woven, porous (such as microporous or nanoporous), cellular, polymer sheets and the like, which are capable of allowing sufficient ionic transport between the reduction and evolution electrodes. In certain embodiments, the substrate is flexible, to accommodate electrochemical expansion and contraction of the cell components, and chemically inert to the cell materials. Materials for the substrate include, but are not limited to, polyolefin (e.g., Gelgard® commercially available from Daramic Inc., Burlington, Mass.), polyvinyl alcohol (PVA), cellulose (e.g., nitrocellulose, cellulose acetate and the like), polyamide (e.g., nylon), cellophane, filter paper and combinations comprising at least one of the foregoing materials. The substrate may also comprise additives and/or coatings such as acrylic compounds and the like to make them more wettable and permeable to the electrolyte.

In other embodiments of the hydroxide-conducting membrane herein, a molecular structure is provided that supports a hydroxide source, such as an aqueous electrolyte. Such membranes are desirable in that conductivity benefits of aqueous electrolytes may be achieved in a self supported solid state structure. In certain embodiments, the membrane may be fabricated from a composite of a polymeric material and an electrolyte. The molecular structure of the polymeric material supports the electrolyte. Cross-linking and/or polymeric strands serve to maintain the electrolyte.

In one example of a molecular structure that supports a hydroxide source, a polymeric material such as polyvinyl chloride (PVC) or poly(ethylene oxide) (PEO) is formed integrally with a hydroxide source as a thick film. In a first formulation, one mole of KOH and 0.1 mole of calcium chloride are dissolved in a mixed solution of 60 milliliters of water and 40 milliliters of tetrahydrogen furan (THF). Calcium chloride is provided as a hygroscopic agent. Thereafter, one mole of PEO is added to the mixture. In a second formulation, the same materials for the first formula are used, with the substitution of PVC for PEO. The solution is cast (or coated) as a thick film onto substrate, such as polyvinyl alcohol (PVA) type plastic material. Other substrate materials preferably having a surface tension higher than the film material may be used. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane or film is formed. Using the above formulations, it is possible to form ionically-conductive films having a thickness in the range of about 0.2 to about 0.5 millimeters.

Another embodiment of a molecular structure is described in greater detail in U.S. patent application Ser. No. 09/259,068, entitled "Solid Gel Membrane", to Muguo Chen, Tsepin Tsai, Wayne Yao, Yuen-Ming Chang, Lin-Feng Li and Tom Karen, filed on Feb. 26, 1999. The polymeric material comprises a polymerization product of one or more monomers selected from the group of water soluble ethylenically unsaturated amides and acids, and optionally a water soluble or water swellable polymer. The polymerized product may be formed on a support material or substrate. The support material or substrate may be, but not limited to, a woven or nonwoven fabric, such as a polyolefin, polyvinyl alcohol, cellulose, or a polyamide, such as nylon.

The electrolyte may be added prior to polymerization of the above monomer(s), or after polymerization. For example, in one embodiment, electrolyte may be added to a solution containing the monomer(s), an optional polymerization initiator, and an optional reinforcing element prior to polymerization, and it remains embedded in the polymeric material after the polymerization. Alternatively, the polymerization may be effectuated without the electrolyte, wherein the electrolyte is subsequently included.

The water soluble ethylenically unsaturated amide and acid monomers may include methylenebisacrylamide, acrylamide, methacrylic acid, acrylic acid, 1-vinyl-2-pyrrolidinone, N-isopropylacrylamide, fumaramide, fumaric acid, N,N-dimethylacrylamide, 3,3-dimethylacrylic acid, sodium salt of vinylsulfonic acid, other water soluble ethylenically unsaturated amide and acid monomers, or combinations comprising at least one of the foregoing monomers.

The water soluble or water swellable polymer, which acts as a reinforcing element, may include polysulfone (anionic), poly(sodium 4-styrenesulfonate), carboxymethyl cellulose, sodium salt of poly(styrenesulfonic acid-co-maleic acid), corn starch, any other water-soluble or water-swellable polymers, or combinations comprising at least one of the foregoing water soluble or water swellable polymers. The addition of the reinforcing element enhances mechanical strength of the polymer structure.

Optionally, a crosslinking agent, such as methylenebisacrylamide, ethylenebisacrylamide, any water-soluble N,N'-alkylidene-bis(ethylenically unsaturated amide), other crosslinkers, or combinations comprising at least one of the foregoing crosslinking agents.

A polymerization initiator may also be included, such as ammonium persulfate, alkali metal persulfates and peroxides, other initiators, or combinations comprising at least one of the foregoing initiators. Further, an initiator may be used in combination with radical generating methods such as radiation, including for example, ultraviolet light, X-ray, γ-ray and the like. However, the chemical initiators need not be added if the radiation alone is sufficiently powerful to begin the polymerization.

In one method of forming the polymeric material, the selected fabric may be soaked in the monomer solution (with or without the ionic species), the solution-coated fabric is cooled, and a polymerization initiator is optionally added. The monomer solution may be polymerized by heating, irradiating with ultraviolet light, gamma-rays, x-rays, electron beam, or a combination thereof, wherein the polymeric material is produced. When the ionic species is included in the polymerized solution, the hydroxide ion (or other ions) remains in solution after the polymerization. Further, when the polymeric material does not include the ionic species, it may be added by, for example, soaking the polymeric material in an ionic solution.

Polymerization is generally carried out at a temperature ranging from room temperature to about 130° C., but preferably at an elevated temperature ranging from about 75° to about 100° C. Optionally, the polymerization may be carried out using radiation in conjunction with heating. Alternatively, the polymerization may be performed using radiation alone without raising the temperature of the ingredients, depending on the strength of the radiation. Examples of radiation types useful in the polymerization reaction include, but are not limited to, ultraviolet light, gamma-rays, x-rays, electron beam, or a combination thereof.

To control the thickness of the membrane, the coated fabric may be placed in suitable molds prior to polymerization. Alternatively, the fabric coated with the monomer solution may be placed between suitable films such as glass and polyethylene teraphthalate (PET) film. The thickness of the film may be varied will be obvious to those of skill in the art based on its effectiveness in a particular application. In certain embodiments, for example for separating oxygen from air, the membrane or separator may have a thickness of about 0.1 mm to about 0.6 mm. Because the actual conducting media remains in aqueous solution within the polymer backbone, the conductivity of the membrane is comparable to that of liquid electrolytes, which at room temperature is significantly high.

In still farther embodiments of the hydroxide-conducting membrane herein, anion exchange membranes are employed. Some exemplary anion exchange membranes are based on organic polymers comprising a quaternary ammonium salt structure functionality; strong base polystyrene divinylbenzene cross-linked Type I anion exchangers; weak base polystyrene divinylbenzene cross-linked anion exchangers; strong base/weak base polystyrene divinylbenzene cross-linked Type II anion exchangers; strong base/weak base acrylic anion exchangers; strong base perfluoro animated anion exchangers; naturally occurring anion exchangers such as certain clays; and combinations and blends comprising at least one of the foregoing materials.

An example of a suitable anion exchange membrane is described in greater detail in U.S. Pat. No. 6,183,914 and incorporated by reference herein. The membrane includes an ammonium-based polymer comprising (a) an organic polymer having an alkyl quaternary ammonium salt structure; (b) a nitrogen-containing, heterocyclic ammonium salt; and (c) a source of hydroxide anion.

As a first component, the ammonium-based polymer includes an organic polymer having an alkyl quaternary ammonium salt structure. Preferred polymer structures include those having alkyl quaternary ammonium groups at the ends of the polymer side chains, exemplified by formula A, below.

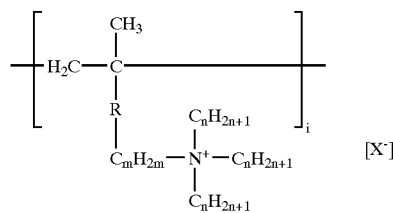

(A)

wherein
R is chosen from a direct bond, —C(O)O— and —C(O)NH—;
m is an integer of from 1 to 3;
n is an integer of from 1 to 4; and
$X^-$ is a counter anion, preferably chosen from $Cl^-$, $Br^-$ and $I^-$.

Organic polymers of formula A may be obtained, for example, as homopolymers from vinyl monomers including the alkyl quaternary ammonium salt structure, or as copolymers from these vinyl monomers and other vinyl comonomers. Formula B exemplifies the copolymers that may be obtained from such a vinyl monomer and a vinyl comonomers.

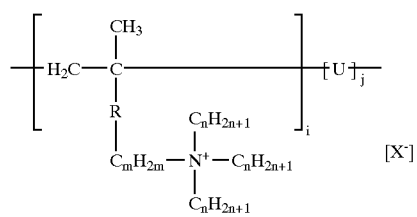

(B)

wherein:
U is a polymer constitutive unit from the copolymerized vinyl comonomer;
R is chosen from a direct bond, —C(O)O— and —C(O)NH—;
m is an integer from 1 to 3;
n is an integer from 1 to 4; and
$X^-$ is a counter anion, preferably chosen from $Cl^-$, $Br^-$ and $I^-$.

Preferably, the vinyl comonomers that provide polymer constitutive unit U, will be those having vinylic unsaturated hydrocarbons. Examples of such vinyl comonomers include, but are not limited to, acrylic monomers, such as, for example, $CH_2$=CHCOOH and $CH_2$=CHCOOR, wherein R is an alkyl group; methacrylic monomers, such as, for example, $CH_2$=$CCH_3$COOH and $CH_2$=$CCH_3$COOR, wherein R is an alkyl group; $CH_2$=[COO($CH_2CH_2O)_nCH_3$]$_2$, wherein n is an integer from 1 to 23; $CH_2$=CH($C_6H_5$); $CH_2$=CHCN; $CH_2$=CHCONH$_2$; vinyl chloride, vinyl pyrrolidone and the like. The copolymers may be obtained from the copolymerization of one or more of these vinyl comonomers by any known process, such as for example, a radical polymerization process, photopolymerization, or the like.

In addition to organic polymers of formula A, the ammonium-based polymer may also comprise monomer units wherein an alkyl quaternary ammonium salt structure is bonded to the main chain of the polymer to form a cyclic structure therein, exemplified by formula C, below.

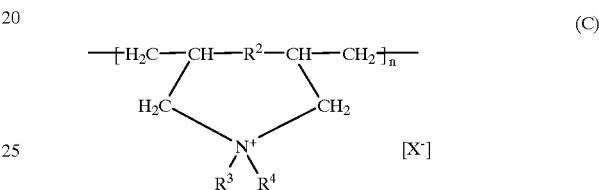

(C)

wherein
$R^2$ is chosen from a direct bond and $CH_2$;
$R^3$ and $R^4$ are each a lower alkyl group;
n is an integer; and
$X^-$ is a counter anion, preferably chosen from $Cl^-$, $Br^-$ and $I^-$.

Organic polymers of formula C may be obtained, for example, by polymerization of diallyl dialkyl ammonium halide monomers, as well from other commercial sources. Poly(diallyl-dimethyl-ammonium) chloride, for example, may be derived from diallyl-dimethyl-ammonium chloride monomer units. In a preferred embodiment of the invention, organic polymers of formula C will have a mean molecular weight of from 20,000 to 500,000.

As a second constitutive component, the ammonium-based polymer includes a nitrogen-containing, heterocyclic quaternary ammonium salt. Preferably, this component is an alkylimidazolium salt or an alkylpyridinium salt, and more preferably, methyl or butyl pyridinium salt. In a preferred embodiment, the counter anion of the salt is chosen from halides such as $Cl^-$, $Br^-$ and $I^-$.

As a third constitutive component, the ammonium-based polymer includes a source of hydroxide anion. Preferably, the source of hydroxide anion is a hydroxide salt, more preferably is a metal hydroxide salt, and most preferably, is aluminum hydroxide.

Without being limited to any particular theory, it is considered that, in the ammonium-based polymer, the hydroxide component forms a complex with the counter anion of either the alkyl quaternary ammonium salt of the organic polymer or the nitrogen-containing, heterocyclic quaternary ammonium compound. It is further considered that complexes of both a quasi-tetrahedral structure and a dimeric quasi-tetrahedral structure with one common counter ion therein are formed, depending on the ratio of the three constitutive components. For example, when the hydroxide component is aluminum hydroxide, both [ALX(OH)$_3^-$] and Al$_2$X(OH)$_6^-$] may be formed.

The preferred ratio of the organic polymer, the nitrogen-containing, heterocyclic quaternary ammonium salt and the metal hydroxide salt varies, depending on the type of organic polymer and ammonium salt utilized. Generally, it is preferred that for one mole of organic polymer, the amount of the nitrogen-containing, heterocyclic ammonium salt ranges from 0.2 to 0.6 moles, and the amount of the hydroxide component ranges from 0.3 to 0.5 moles.

The ammonium-based polymer may be produced by any ordinary method, such as for example, by uniformly dissolving the components in an appropriate solvent such as, for example, water, nitromethane or a lower alcohol, whereby the resulting solution is then spread over a flat substrate. The solvent is evaporated out and a film obtained, which is subsequently formed into particulate material.

As a means to increase the mechanical strength of an ammonium-based polymer prepared in accordance with the principles of the present invention, the composition may further include a binder, such as for example, an acrylic, polyethylene, or the like. The binder may be uniformly dissolved along with the other components during preparation of the initial composition. The modified membrane exhibits the same order of conductivity as the three component membrane, along with an increased tensile strength.

The oxygen evolving electrode may comprise any suitable oxygen evolving catalyst, such as nickel or combinations and alloys comprising nickel. One particularly useful nickel alloy is Raney nickel. The oxygen evolving electrode may be provided as a discreet structure, or may be formed directly upon the membrane.

The oxygen reducing electrode may comprise any suitable air cathode, such as a carbon supported catalyst structure. The oxygen reducing electrode may be provided as a discreet structure, or may be formed directly upon the membrane. An exemplary oxygen reducing electrode is disclosed in copending, commonly assigned U.S. patent application Ser. No. 09/415,449, entitled "Electrochemical Electrode For Fuel Cell", to Wayne Yao and Tsepin Tsai, filed on Oct. 8, 1999, which is incorporated herein by reference in its entirety. Other electrodes may instead be used, however, depending on the performance capabilities thereof, as will be obvious to those of skill in the art.

An oxygen reduction/evolution catalyst utilized on the anode and/or cathode may be fabricated from various materials, including precious metals, such as platinum and silver, non-precious-metal-based inorganic catalysts, such as cobalt-phathanocyanine, cobalt tetramethoxypheny porphyrin, manganese phathanocyanine, iron phathanocyanine, $MnO_x$, various nano-grain perovskites (e.g. $LaMnO_3$) and spinels (e.g. $LiMnO_2$) and combinations comprising at least one of the foregoing materials. Different types of catalysts may provide better performance on the anode vs. the cathode, therefore various embodiments of the present invention may employ two discrete catalysts.

The catalyst may be utilized in both ink (dilute) and slurry (thicker) states applied using various application techniques. One such technique includes spray coating, in which the catalyst ink is sprayed onto the membrane. Another technique is the well-known Doctor Blade method for applying a layer of catalyst onto the membrane surface. A third approach is silk printing, in which a silk screen will be used to print the slurry onto the membrane surface with predetermined thickness. Those skilled in the art will recognize that a particular application process may be selected based upon the particular variations in adhesion, uniformity, and run-to-run thickness consistency provided thereby.

In certain embodiments, particularly when either or both the anode and the cathode are provided as discreet structures adjacent to the membrane, an interfacial material is utilized therebetween. One suitable interfacial material is described in copending U.S. Provisional Patent Application No. 60/274,274 filed Mar. 8, 2001 entitled "Interfacial Material For Metal Air Electrochemical Cells," which is incorporated herein by reference. The interfacial material may be in the form of a gel comprising an alkaline solution and a gelling agent, as described above. With the inclusion of the interfacial layer, it is possible to reducing the impedance between the electrode and the membrane, and thus improve the ionic contact between the cathode and the electrolyte. This may be accomplished while enhancing contact between the electrode and the membrane. While not wishing to be bound by theory, it is believed that the interfacial layer serves as a bridge agent to wet the cathode surface. Further, the internal adhesion of the cathode itself may be improved (e.g., where cathode particles may be subject to delaminating from the surface or are loosely packed), as well as the adhesion between the cathode and the separator (thus) minimizing or preventing delamination). The gel for the interfacial layer may further comprise a catalyst material, which may be similar to the catalyst material used for the electrodes.

The following illustrative example is intended to demonstrate certain aspects of the present invention. It is to be understood that the example should not be construed as limiting. Further, the example presented was conducted for the purpose of demonstrating oxygen evolution using a hydroxide conducing membrane described herein. The system components and parameters have not been optimized.

EXAMPLE 1

Cell Construction

Membrane Construction

A hydroxide-conducting polymeric membrane is formed according to following procedure. 0.75 grams methylenebisacrylamide, 0.56 g acrylamide, 4.70 g methacrylic acid, and 0.25 g poly(sodium 4-styrenesulfonate) are dissolved in 10 milliliters water and then 20 ml 40% KOH is added to the resulting solution, which is maintained at room temperature. 0.05 g ammonium persulfate is then added to the solution. A piece of fabric is soaked in the resulting monomer solution and then sandwiched between a piece of glass and a piece of PET transparent film. This is heated on a 75° C. hotplate for 1 minute and then irradiated under strong UV light for 5 minutes, whereby a strong polymer film will be formed. The membrane used in the demonstrative example herein was 0.55 mm (21.6 mil).

Electrodes

An air cathode, commercially available from AluPower, Inc., Pawcatuck, Conn. (ACN-175) is disposed on the air side of the membrane. The cathode has a thickness of 0.5 mm (19.7 mil). A thin layer of interfacial gel electrolyte is applied to the membrane to enhance adhesion and conductivity between the cathode and the membrane. The is was formed from 2.5% polyacrylic acid having a weight basis average molecular weight of about 3,000,000 and 45% KOH.

The anode is cast on the opposite side of the membrane, wherein the anode comprises Raney nickel (25% solid, commercially available from Aldrich, Milwaukee, Wis.) in a solution of 5% Nafion® (commercially available from E. I. du Pont Nemours and Company Corp., Wilmington, Del.) in alcohol. The solution is allowed to dry. The resultant anode thickness in the demonstrative example herein was 0.2 mm (8 mil)

Cell Structure

Referring now to FIGS. 6 and 7, an exemplary cell is depicted. A conducting/supporting structure 400*a* is shown in FIG. 6, which is used on the cathode side of the cell. A structure 400b used on the anode side of the cell (see FIG. 7) is similar. In the experimental run presented herein, each of the structures 400a and 400b had an overall diameter of 6 cm (2.361 inches) and thickness of 2.5 cm (0.986 inches), and were formed of stainless steel to support the membrane electrode assembly (comprising the electrodes and the membrane therebetween, referred to as the "MEA") and further to act as current collectors. Faces 402 of the structures 400a and 400b include a recess 404 that supported the active area of the cell, which in the experimental run presented herein, had a diameter of 3.6 cm and a depth of 1.01 mm (39.8 mil). An assembly 480 of nickel mesh and foam structures is disposed in the recess 404 of structure 400a, and a cathode 412 is adjacent thereto. In the experimental run herein, the assembly 480 comprised a first mesh structure adjacent to structure 400a that was 0.41 mm (16 mil) thick and 20 mesh, and a second foam structure between the first mesh structure and the cathode 412 that was 1.3 mm (51 mil) thick and 110 mesh). A membrane 410, having an anode 414 cast thereon as described herein, is assembled adjacent to the structure 400b having an assembly 482. In the experimental run herein, the assembly 482 comprised a first mesh structure adjacent to structure 400a that was 0.41 mm (16 mil) thick and 20 mesh, and a second foam structure between the first mesh structure and the cathode 412 that was 1.3 mm (51 mil) thick and 110 mesh). Matching faces of the structures 400a and 400b were pressed against each other. Structure 400a used an O-ring (not shown) to seal the joint. The overall unit was clamped together by two end plates made of non-conducting ABS plastic, bolts and wing nuts.

For gas flow to pass over an electrode placed adjacent to the face 402 of structures 400a and 400b, a passageway 406 (having a diameter of 0.87 cm (0.343 inches) was formed across the diameter of structure 400a at the midpoint of the thickness of the structure, and having suitably threaded ends for insertion of plastic tubing. Further, a plurality of passageways 408 (having diameters of 1.98 mm (0.078 inches)) extended from the base of the recess 404 to passageway 406 at 1.01 cm (0.398 inches) and 1.52 cm (0.598 inches) from the center point (on both sides) of the recess 404. For passage of current through the cell, electrical leads were attached to the structures.

Experimental Procedure

Humidified air was passed across the cathode, while helium swiped the anode (for He sweep purity validation). A humidified He stream was obtained by drawing He from a cylinder and then sending through a stainless steel bubbler partially filled with water. Humidified air stream was obtained by drawing air free of carbon dioxide from a cylinder and passing it through a water column in a separate stainless steel bubbler. The flow rates of the streams were monitored using a digital readout and controller module (Matheson, Model 8251).

To measure the concentration of $O_2$ in the exit He, a slipstream was sent to a Gas Chromatograph (GC) (Hewlett Packard, Model 5890 Series III). Before being sent to the GC, moisture from the sample stream was removed by a Nafion® drier (Perma Pure, Fort Wayne, Ind.). The GC employed a thermal conductivity detector (TCD) and a molecular sieve column (6'x⅛" SS-13X-60/80, Alltech, Deerfield, Ill.). The carrier gas was He and its flow rate was 30 m/min. The temperatures of the oven, injector and detector were set at 35° C., 200° C., and 200° C., respectively. Retention times for $O_2$ and $N_2$ were approximately 1.5 minutes and 1.7 minutes, respectively.

After suitable validation procedures (including passing He across the cathode and anode), the experiment was conducted. A power source was turned on to apply a DC voltage across the cell. The air-separation was initiated by sending a humidified air stream through the cathode chamber at a flow rate of 15 sccm, and the relative humidity of the exit air stream was measured to be about 74%. The anode chamber had He at a flow rate of 30 sccm. Both the lines (sweep He and feed air) were open to atmosphere at their respective ends. The power source was turned on, and for the next 40 minutes, the applied voltage was raised slowly from 0 to 1.2 V. GC analyses of the sweep He was carried out periodically. At potential less than 0.6 volts, the current through the cell was of zero value. The current reading was 0.01 amps at 0.7 V. At 1 V, the current was of 0.04 A; the corresponding GC sampling yielded a chromatogram having a single peak with a retention time of 1.59 minutes. Evidently, $O_2$ was present in the sweep He. As the potential was raised to 1–1.2 V, the current reached 0.05 A. Increase of potential to 1.4 V yielded a steady current of 0.05 A. For the following 45 minutes, the current-voltage condition was kept steady at 0.05 A and 1.2 V. A number of chromatograms were obtained from GC analysis of the exit He showing singular peaks of $O_2$. The run was ended, after operating for 1.5 hours.

Figure 8:
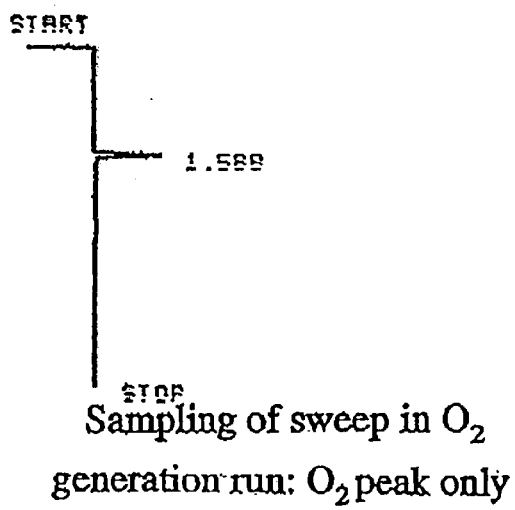
FIG. 8 is a sampling of sweep in an oxygen generation process using an exemplary embodiment showing an oxygen peak only.

The result of oxygen generating run-condition is represented in FIG. 8. The chromatogram has a singular peak with retention time of 1.59 min, which was oxygen's retention time as obtained from sampling of air. This confirmed that oxygen was generated at the anode chamber of the cell. From the GC calibration, it was determined that the concentration of freshly generated $O_2$ in the sweep He was 2350 parts per million based on volume (ppmv). The effective membrane area was 10.2 cm². For the above concentration of oxygen in a He sweep having a flow rate of 30 scm³/min, the corresponding flux was found to be $1.15 \times 10^{-4}$ scm³/s·cm². The thermodynamic driving force was the gradient in the partial pressure of $O_2$, which was about 16 cm Hg. It is assumed that ambient air at the cathode side has 21% $O_2$, and the $O_2$ on the anode side approaches zero (due to the He sweep). Using the values of thickness of the membrane (0.055 cm), partial pressure gradient and the flux, the permeability coefficient was calculated as:

$$4.0 \times 10^{-7} \ (scm^3 \cdot cm)/(cm^2 \cdot s \cdot cmHg) = 4000 \text{ Barrer units.}$$

The permeability in terms of Barrer units is presented to provide relative comparison to known art. However, the voltage applied is not accounted for. Nonetheless, considering the relatively low current density of the system, it is possible to attain extremely high oxygen flux upon optimization of the system.

By utilizing the hydroxide ion ($OH^-$) instead of oxide ion ($O^{2-}$) to shuttle the oxygen molecule through a membrane, oxygen throughput is substantially increased relative to the prior art.

Moreover, the operating temperature may be reduced relative to the prior art, from up to or greater than about 800° C. to room temperature. This will greatly reduce the system cost and alleviate many engineering problems, such as difficulties with gas sealing as discussed hereinabove.

The hydroxide-conducting membrane of the present invention advantageously may be utilized in many chemical, electronics and medical technologies that depend on high-purity oxygen. Additionally, the present invention may be utilized to assist in making many industrial processes more environmentally sound.

While preferred embodiments have been shown and described, various modifications and substitutions may be made thereto without departing from the spirit and scope of the invention. Accordingly, it is to be understood that the present invention has been described by way of illustrations and not limitation.

Having thus described the invention, what is claimed is:

What is claimed is:

1. An electrochemical cell for separating a first gas from a mixture of gas comprising:
   a first electrode in fluid communication with an inlet for receiving the mixture of gas;
   a second electrode in fluid communication with an outlet for the first gas; and
   a hydroxide-conducting membrane between the first electrode and the second electrode, wherein the membrane comprises a composite of a cross-linked polymeric structure and a hydroxide-conducting medium.

2. The electrochemical cell as in claim 1, wherein the polymeric structure comprises a polymerization product of one or more monomers selected from the group of water soluble ethylenically unsaturated amides and acids.

3. The electrochemical cell as in claim 2, wherein the polymeric structure further comprises a water soluble or water swellable polymer.

4. The electrochemical cell as in claim 3, wherein the polymeric structure water soluble or water swellable polymer is selected from the group consisting of polysulfone, poly(sodium 4-styrenesulfonate), carboxymethyl cellulose, sodium salt of poly(styrenesulfonic acid-co-maleic acid), corn starch and combinations comprising at least one of the foregoing water soluble or water swellable polymers.

5. The electrochemical cell as in claim 3, wherein the polymeric structure is formed on a substrate.

6. The electrochemical cell as in claim 5, wherein the substrate is selected from the group consisting of polyolefin, polyvinyl alcohol, cellulose and polyamide.

7. The electrochemical cell as in claim 2, wherein the hydroxide-conducting medium is added prior to polymerization.

8. The electrochemical cell as in claim 2, wherein the hydroxide-conducting medium is added after polymerization.

9. The electrochemical cell as in claim 2, wherein the one or more monomers is selected from the group consisting of methylenebisacrylamide, acrylamide, methacrylic acid, acrylic acid, 1-vinyl-2-pyrrolidinone, N-isopropylacrylamide, fumaramide, fumaric acid, N,N-dimethylacrylamide, 3,3-dimethylacrylic acid, the sodium salt of vinylsulfonic acid and combinations comprising at least one of the foregoing monomers.

10. The electrochemical cell as in claim 2, wherein the polymeric structure further comprises a cross-linking agent.

11. The electrochemical cell as in claim 10, wherein the cross-linking agent is selected from the group consisting of methylenebisacrylamide, ethylenebisacrylamide, any water-soluble N,N'-alkylidene-bis(ethlylenically unsaturated amide) and combinations comprising at least one of the foregoing crosslinking agents.

12. The electrochemical cell as in claim 2, wherein the polymeric structure further comprises a polymerization initiator.

13. The electrochemical cell as in claim 12, wherein the polymerization initiator is selected from the group consisting of ammonium persulfate, alkali metal persulfates and peroxides and combinations comprising at least one of the foregoing initiators.

14. The electrochemical cell as in claim 1, wherein the first gas is oxygen and the mixture of gas is air.

15. The electrochemical cell as in claim 1, further comprising a voltage source for applying a voltage across the a first electrode and the a second electrode.

16. The electrochemical cell as in claim 1, further comprising a conductor between the a first electrode and the a second electrode.

17. An electrochemical cell for separating a first gas from a mixture of gas comprising:
   a first electrode in fluid communication with an inlet for receiving the mixture of gas;
   a second electrode in fluid communication with an outlet for the first gas; and
   a hydroxide-conducting membrane between the first electrode and the second electrode, wherein the hydroxide-conducting membrane consists essentially of a composite of a cross-linked polymeric structure and a hydroxide-conducting medium.

18. The electrochemical cell as in claim 17, wherein the polymeric structure comprises a polymerization product of one or more monomers selected from the group of water soluble ethylenically unsaturated amides and acids.

19. The electrochemical cell as in claim 18, wherein the polymeric structure further comprises a water soluble or water swellable polymer.

20. The electrochemical cell as in claim 19, wherein the polymeric structure water soluble or water swellable polymer is selected from the group consisting of polysulfone, poly(sodium 4-styrenesulfonate), carboxymethyl cellulose, sodium salt of poly(styrenesulfonic acid-co-maleic acid), corn starch and combinations comprising at least one of the foregoing water soluble or water swellable polymers.

21. The electrochemical cell as in claim 18, wherein the polymeric structure is formed on a substrate.

22. The electrochemical cell as in claim 21, wherein the substrate is selected from the group consisting of polyolefin, polyvinyl alcohol, cellulose and polyamide.

23. The electrochemical cell as in claim 18, wherein the hydroxide-conducting medium is added prior to polymerization.

24. The electrochemical cell as in claim 18, wherein the hydroxide-conducting medium is added after polymerization.

25. The electrochemical cell as in claim 18, wherein the one or more monomers is selected from the group consisting of methylenebisacrylamide, acrylamide, methacrylic acid, acrylic acid, 1-vinyl-2-pyrrolidinone, N-isopropylacrylamide, fumaramide, fumaric acid, N,N-dimethylacrylamide, 3,3-dimethylacrylic acid, the sodium salt of vinylsulfonic acid and combinations comprising at least one of the foregoing monomers.

26. The electrochemical cell as in claim 18, wherein the polymeric structure further comprises a cross-linking agent.

27. The electrochemical cell as in claim 26, wherein the cross-linking agent is selected from the group consisting of methylenebisacrylamide, ethylenebisacrylamide, any water-soluble N,N'-alkylidene-bis(ethylenically unsaturated amide) and combinations comprising at least one of the foregoing crosslinking agents.

28. The electrochemical cell as in claim 27, wherein the polymeric structure further comprises a polymerization initiator.

29. The electrochemical cell as in claim 28, wherein the polymerization initiator is selected from the group consisting of ammonium persulfate, alkali metal persulfates and peroxides and combination comprising at least one of the foregoing initiators.

30. The electrochemical cell as in claim 17, wherein the first gas is oxygen and the mixture of gas is air.

31. The electrochemical cell as in claim 17, further comprising a voltage source for applying a voltage across the a first electrode and the a second electrode.

32. The electrochemical cell as in claim 17, further comprising a conductor between the a first electrode and the a second electrode.

* * * * *